(12) United States Patent
Werner et al.

(10) Patent No.: US 12,100,241 B2
(45) Date of Patent: Sep. 24, 2024

(54) METHOD TO IDENTIFY AFFILIATES IN VIDEO DATA

(71) Applicant: IDEMIA Identity & Security Germany AG, Bochum (DE)

(72) Inventors: Martin Werner, Hemer (DE); Andre Garstka, Dortmund (DE); Yednekachew Worku Asfaw, Irvine, CA (US)

(73) Assignee: IDEMIA Identity & Security Germany AG, Bochum (DE)

( * ) Notice: Subject to any disclaimer, the term of this patent is extended or adjusted under 35 U.S.C. 154(b) by 269 days.

(21) Appl. No.: 17/314,536

(22) Filed: May 7, 2021

(65) Prior Publication Data

US 2021/0350138 A1    Nov. 11, 2021

(30) Foreign Application Priority Data

May 7, 2020    (EP) .................................... 20173370

(51) Int. Cl.
*G06K 9/00* (2022.01)
*G06F 18/22* (2023.01)
(Continued)

(52) U.S. Cl.
CPC .............. *G06V 40/16* (2022.01); *G06F 18/22* (2023.01); *G06V 10/751* (2022.01); *G06V 20/30* (2022.01);
(Continued)

(58) Field of Classification Search
CPC .... G06K 9/6215; G06V 10/751; G06V 20/30; G06V 20/41; G06V 20/44; G06V 20/46;
(Continued)

(56) References Cited

U.S. PATENT DOCUMENTS

2011/0150278 A1* 6/2011 Shimizu ............... G06V 10/768
382/103
2013/0329958 A1* 12/2013 Oami ................... G06V 40/103
382/103
(Continued)

OTHER PUBLICATIONS

Extended European Search Report Issued by the European Patent Office for European Patent Application No. 20173370.6, dated Oct. 6, 2020.

*Primary Examiner* — Michael J Vanchy, Jr.
(74) *Attorney, Agent, or Firm* — Bradley Arant Boult Cummings LLP; Henry B Ward, III

(57) ABSTRACT

The invention refers to a computer-implemented method of analyzing video data to identify affiliates of an object of interest, the method comprising: identifying a plurality of occurrences of the object of interest in the video data; determining a set of potential affiliates for the object of interest from a plurality of other objects in the video data based on a criterion of closeness between the object of interest at each occurrence and each other object; analyzing the set of potential affiliates to obtain a similarity score for each potential affiliate at each occurrence from the plurality of occurrences, each similarity score indicating a degree of similarity with respect to a selected reference potential affiliate in the set of potential affiliates; and identifying a potential affiliate as an affiliate of the object of interest based on the similarity scores.

10 Claims, 3 Drawing Sheets identifying a plurality of occurrences of the object of interest in the video data — 101 determining a set of potential affiliates for the object of interest from a plurality of other objects in the video data based on a criterion of closeness between the object of interest at each occurrence and each other object — 102 analyzing the set of potential affiliates to obtain a similarity score for each potential affiliate at each occurrence from the plurality of occurrences, each similarity score indicating a degree of similarity with respect to a selected reference potential affiliate in the set of potential affiliates — 103 identifying a potential affiliate as an affiliate of the object of interest based on the similarity scores — 104

(51) Int. Cl.
  *G06K 9/62*  (2022.01)
  *G06V 10/75*  (2022.01)
  *G06V 20/30*  (2022.01)
  *G06V 20/40*  (2022.01)
  *G06V 20/52*  (2022.01)
  *G06V 20/58*  (2022.01)
  *G06V 40/16*  (2022.01)
  *G06V 20/62*  (2022.01)

(52) U.S. Cl.
  CPC .............. *G06V 20/41* (2022.01); *G06V 20/46* (2022.01); *G06V 20/52* (2022.01); *G06V 20/584* (2022.01); *G06V 40/161* (2022.01); *G06V 20/44* (2022.01); *G06V 20/625* (2022.01)

(58) Field of Classification Search
  CPC .... G06V 20/52; G06V 20/584; G06V 20/625; G06V 40/16; G06V 40/161
  See application file for complete search history.

(56) References Cited

U.S. PATENT DOCUMENTS

2020/0104576 A1* 4/2020 Usuki .................... G06V 20/30
2021/0117724 A1* 4/2021 Taheri .................. G06V 30/274

* cited by examiner

METHOD TO IDENTIFY AFFILIATES IN VIDEO DATA

FIELD OF THE INVENTION

The invention refers to a computer-implemented method of analyzing video data.

PRIOR ART

In video investigation, especially investigations for law enforcement and/or intelligence purposes, a key task is to understand the content of information resources and correlate relations, e.g. the course of action that is happening or has happened and the involved objects/parties/persons, generally referred to as objects of interest. Sources of the investigation are video recordings/pictures (e.g. from cameras, mobile devices, Video Management Systems (VMS), etc.), live video streams/pictures, auxiliary sensor streams (e.g. social media data, data from WLAN trackers etc.) or a combination of all.

Questions to be answered in this regard include how to detect the objects of interest and what are their relationships in the available data.

In video analytics, object detectors (face, car, person etc.), motion detection, etc. are used to detect objects of interest. Biometric technologies like face recognition is used to identify persons. This may be augmented with data from other sensors as described above.

Typically, a first task is to track an object of interest (e.g. an individual person) in the data, i.e. determine all occurrences of the object in the data and deduce the time and location of the occurrences. This can happen in post-event analysis (where has the person been?), real-time analysis (where is the person now?) or a combination of both use cases.

The second important task is to identify potential affiliates (in other words: associates) of an object of interest, especially (but not limited to) an individual. This essentially requires grouping all occurrences of the object and corresponding affiliates for each occurrence.

An 'affiliate' to an object of interest in this context can be defined as persons/objects within a defined spatial and temporal proximity to the object of interest. These affiliates can be selected purely based on spatial/temporal proximity and through additional filters such as similarity (for example matching clothing), size/position within the scene, etc. Manual investigation can be a very time-consuming and annoying procedure, so automation or tools to improve the procedure are desirable.

DESCRIPTION OF THE INVENTION

The invention at least partially overcomes the disadvantages of the prior art procedure.

The invention provides a method according to claim 1.

Claim 1 is directed to a computer-implemented method of analyzing video data to identify affiliates of an object of interest, the method comprising: identifying a plurality of occurrences of the object of interest in the video data; determining a set of potential affiliates for the object of interest from a plurality of other objects in the video data based on a criterion of closeness between the object of interest at each occurrence and each other object; analyzing the set of potential affiliates to obtain a similarity score for each potential affiliate at each occurrence from the plurality of occurrences, each similarity score indicating a degree of similarity with respect to a selected reference potential affiliate in the set of potential affiliates; and identifying a potential affiliate as an affiliate of the object of interest based on the similarity scores.

The advantage of the method according to the invention is that at least the analyzing regarding a similarity of potential affiliates to a selected reference potential affiliate in the set of potential affiliates is performed by a computer.

The method according to the invention can be developed in that one or more reference potential affiliates are selected manually or automatically. If the reference potential affiliate is selected automatically (by the computer device), the method further reduces the workload on law enforcement personnel. The manual selection may have the advantage of greater accuracy with regards to certain attributes an affiliate shall have.

According to another development, the similarity score is binary (such that the score consist of only two values, such as yes or no, true or false, 1 or 0, etc.) and is defined such that a potential affiliate is the same or not the same when compared to the reference affiliate; or wherein the similarity score is non-binary and defined as a probability that a potential affiliate is the same as the reference potential affiliate.

This may be further developed in that identifying an affiliate of the object of interest comprises determining an affiliate score as the number of occurrences of the same potential affiliate in the plurality of occurrences in case of the binary similarity score; or in that identifying an affiliate of the object of interest comprises determining an affiliate score as a sum of the similarity scores at different occurrences in the plurality of occurrences in case of the non-binary similarity score.

The affiliate scores may be used such that the method further comprises sorting and/or ranking and/or displaying the affiliates according to the affiliate scores. For example, in case of a binary score, a ranking can be made regarding the number of occurrences of the respective potential affiliates, wherein a comparably higher number would be related to a higher ranking.

The method according to the invention or one of the developments may be further developed in that the criterion of closeness comprises at least one of a spatial proximity to the object of interest and/or a temporal proximity; optionally, wherein the spatial proximity comprises at least one of closeness in space and/or pixels, similar inter-eye distance, maximum pixel distance, size and position of detected objects; further optionally, wherein the temporal proximity comprises the potential affiliate being located within a predefined time interval that includes a respective occurrence of the object of interest.

According to a development, the object of interest may be a person of interest and the potential affiliates may be potential affiliate persons.

In such a case (i.e. for persons), results of face detection may be used to define the set of potential affiliates in the video data.

Additionally or alternatively, analyzing the set of potential affiliates may comprise using at least one of facial recognition, person recognition, person detection, speaker detection, speaker recognition, a unique identifier of a device that the person of interest and/or the potential affiliate person carries, data of social media posted by the person of interest and/or the potential affiliate person, such as indicating that they are/were present at a certain time and date in a certain area.

The method according to the invention may be further developed in that the object of interest is a car of interest and the potential affiliates are potential affiliate cars, optionally, analyzing the set of potential affiliates may comprise analyzing a frequency of occurrence of cars travelling together by using license plate detection/recognition.

The method according to the invention or one of the developments may be further developed in that the method is performed initially on recorded video data or live video date, is continually updated as new video data is available, and new occurrences of the object of interest and/or a new potential affiliate are identified as either one of an existent affiliate or as a new affiliate, in particular further comprising updating a number of occurrences of the affiliates.

According to another development, additional filters may be used to determine the set of potential affiliates, such as matching a predefined description or occurring at a particular size/position within a scene.

The invention further provides a device according to claim 13.

Claim 13 is directed to a device for analyzing video data to identify affiliates of an object of interest, comprising processing circuitry configured to: identify a plurality of occurrences of the object of interest in the video data; determine a set of potential affiliates for the object of interest from a plurality of other objects in the video data based on a criterion of closeness between the object of interest at each occurrence and each other object; analyze the set of potential affiliates to obtain a similarity score for each potential affiliate at each occurrence from the plurality of occurrences, each similarity score indicating a degree of similarity with respect to a selected reference potential affiliate in the set of potential affiliates; and identify a potential affiliate as an affiliate of the object of interest based on the similarity scores.

The device according to the invention is configured to perform the method of the invention, such that the above-mentioned advantages apply similarly.

According to a development of the inventive device, it may further comprise a display, wherein the processing circuitry if further configured to display an icon representing the object of interest and icons representing respective affiliates according to an affiliate score, in particular closer to each other the higher the affiliate score.

The device may be configured to select one or more reference potential affiliates manually or automatically.

Additional features and advantages of the present invention will be described with reference to the drawings. In the description, reference is made to the accompanying figures that are meant to illustrate preferred embodiments of the invention. It is understood that such embodiments do not represent the full scope of the invention.

EMBODIMENTS

The following embodiments are described in sufficient detail to enable those skilled in the art to make use of the disclosure. It is to be understood that other embodiments would be evident, based on the present disclosure, and that system, structure, process or mechanical changes may be made without departing from the scope of the present disclosure. In the following description, numeral-specific details are given to provide a thorough understanding of the disclosure. However, it would be apparent that the embodiments of the disclosure may be practiced without the specific details. In order to avoid obscuring the present disclosure, some well-known circuits, system configurations, structure configurations and process steps are not disclosed in detail.

Figure 1:
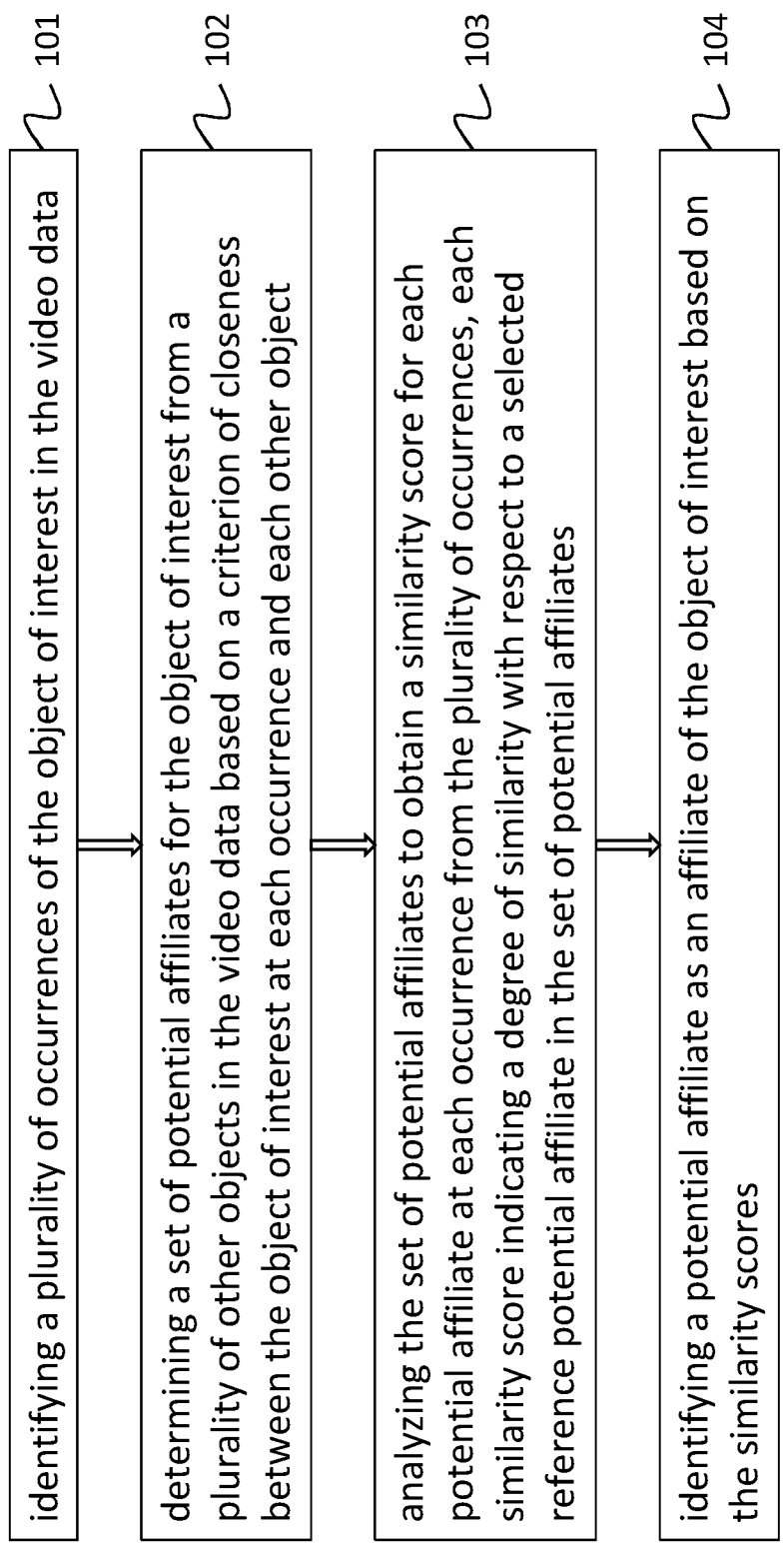
FIG. 1 illustrates a method according to an embodiment of the invention.

FIG. 1 illustrates a method according to an embodiment of the invention.

This embodiment of the computer-implemented method of analyzing video data to identify affiliates of an object of interest comprises the steps of:

Step 101: identifying a plurality of occurrences of the object of interest in the video data;

Step 102: determining a set of potential affiliates for the object of interest from a plurality of other objects in the video data based on a criterion of closeness between the object of interest at each occurrence and each other object;

Step 103: analyzing the set of potential affiliates to obtain a similarity score for each potential affiliate at each occurrence from the plurality of occurrences, each similarity score indicating a degree of similarity with respect to a selected reference potential affiliate in the set of potential affiliates; and Step 104: identifying a potential affiliate as an affiliate of the object of interest based on the similarity scores.

Figure 2:
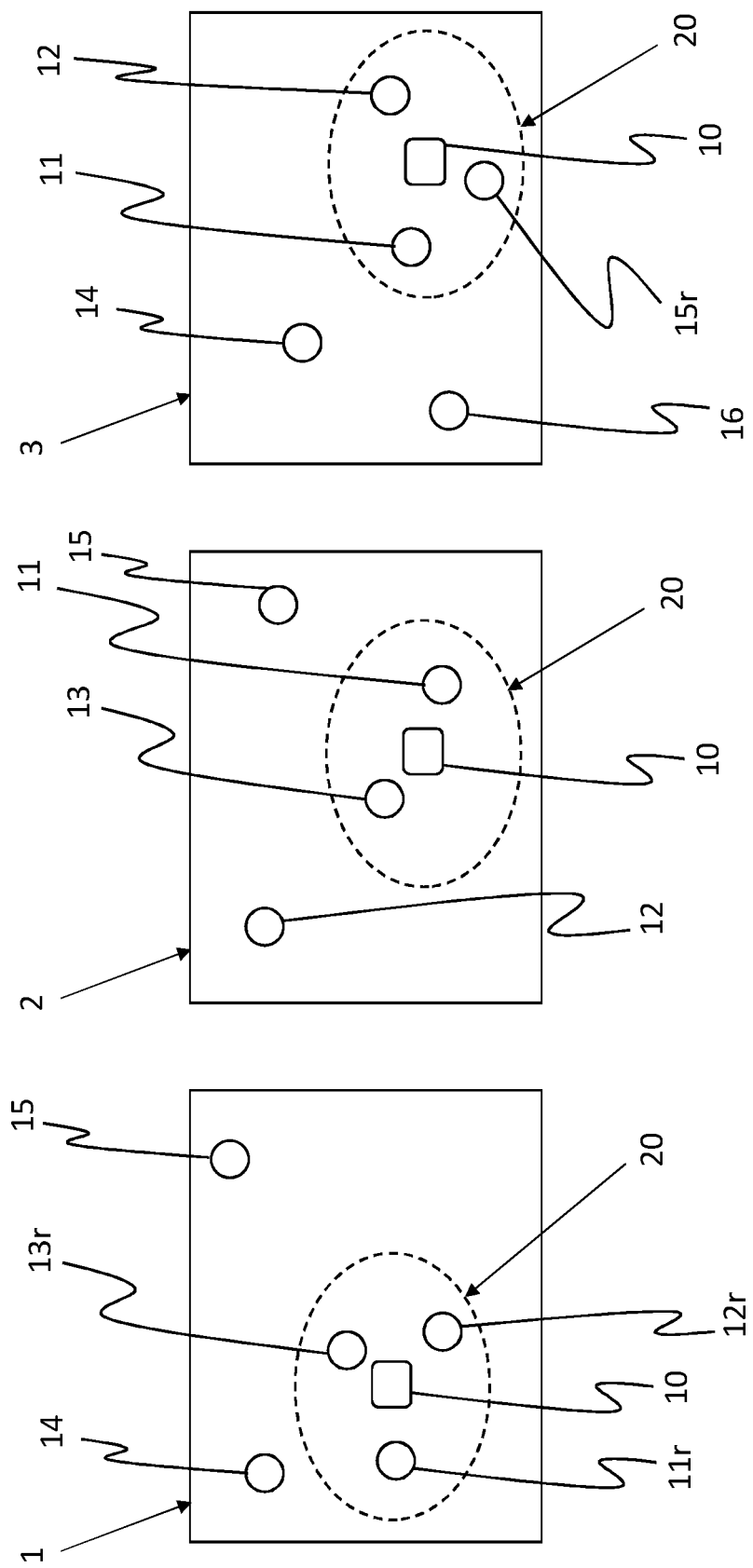
FIG. 2 shows video frames illustrating an embodiment of the invention.

The method is further described using FIG. 2.

FIG. 2 shows video frames illustrating an embodiment of the invention.

In FIG. 2 three different video frames 1, 2, and 3 of recorded video data at three different points in time are shown. Here, the object of interest is a person of interest 10. The person of interest 10 appears in all three frames 1, 2, 3, corresponding to three occurrences of the person of interest 10. The criterion of closeness with respect to other persons in the video frames 1, 2, 3 is shown as region/space 20 around the person of interest 10.

In the first frame 1, persons 11r, 12r, and 13r are located within the region 20, and these are potential affiliates. These may also be defined as the reference affiliates to be compared with persons in the other frames 2, 3. The similarity score in this embodiment is binary and defined in such a way that a potential affiliate is the same or not the same when compared to a reference affiliate. Frame 1 includes potential affiliates 11r, 12r, 13r and two other persons 14, 15.

In video frame 2, potential affiliates 11, 13 are present in region 20, while other persons 12, 15 are shown. In fact, this illustrates the situation that person 12 is no longer with the region 20, and person 14 is no longer included in the second frame. However, persons 11 and 13 have remained in the region 20 and have been identified (e.g. by face recognition) as being identical to persons 11r and 13r, respectively.

In the third frame 3, persons 11, 12, and 15r are located within region 20, while persons 14 and 16 are located outside region 20 but within frame 3. Person 16 corresponds to a person that has not been previously captured in one of frames 1, 2. Since person 15 now fulfills the closeness criterion, it may be used as a reference potential affiliate.

An affiliate score can be defined as the number of occurrences of the same potential affiliate in the plurality of occurrences. The affiliate score for person 11 is 3 (since it appears within the region 20 in all three frames), for person 12 is 2, for person 13 is 2, and for person 15 is 1. This corresponds to ranking of the affiliates. From this result, it may be concluded that person 11 is related to the person of interest 10, since the affiliate score is high, while persons 12 and 13 also seem to be related to the person of interest 10, but to a somewhat lesser extent, and more so regarding person 15. It may be concluded that persons 14 and 16 are not related to the person of interest 10, and consider their appearance in the frames as coincidental.

Figure 3:
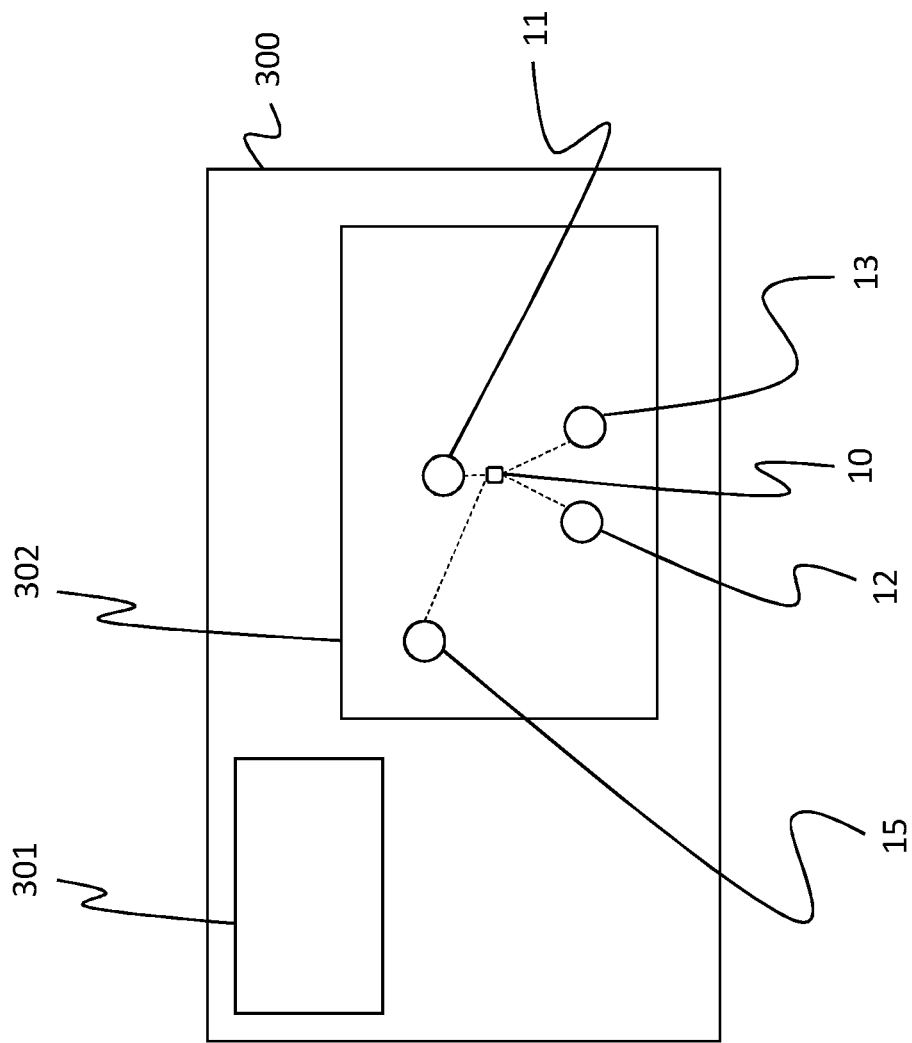
FIG. 3 illustrates a device according to an embodiment of the invention.

FIG. 3 illustrates a device according to an embodiment of the invention.

The device 300 for analyzing video data to identify affiliates of an object of interest comprises a processing circuitry 301 configured to perform the method steps as described above. Further it includes a display device 302 for displaying video date or results of the analyzing steps. In particular, the processing circuitry 301 may be further configured to display an icon representing the person of interest 10 and icons representing respective affiliates 11, 12, 13, 15 according to the affiliate score, in particular closer to each other the higher the affiliate score.

In the following, the invention is summarized and further embodiments of the invention are indicated.

Framework for Affiliate Clustering:

Below, we define the procedure for an 'affiliate clustering' use case based on person identity. The proposed procedure consists of three steps.

Collect all occurrences of the target identity (person of interest) in the data (e.g. the recorded video). The target identity may be a known or unknown identity.

Collect all information on all identities that occur close to the target person. "Close" in this context means "close in some kind of distance". An example in a video stream would mean "close=close in space (in pixels), physical proximity approximated using inter-eye distance, or person height of the target identity as a reference, and close in time (e.g. +−5 seconds). All occurrences of identities that fulfill the "closeness" criteria to all occurrences of the target identity define the set of potential affiliates. These typically will not be a set of unique identities, i.e. there may be multiple occurrences (and associated data) of the same identity in this set.

Clean up (grouping) the set of potential affiliates
  Full manual
    Start with one occurrence of one identity and review all other occurrences of the set to decide, if they are from the same or a separate identity.
    If they are the same, mark them as one identity if they are not the same, mark them as different identities.
    Iterate through all occurrences until all of them are marked.
  Half manual.
    Start with one occurrence and automatically compare with all other occurrences of the set to decide, if they are from the same or a separate identity (e.g. using biometric 1:1 or biometric 1:n matching).
      If the biometric comparison score is high (above an adjustable high threshold) automatically mark them as one identity.
      If the biometric comparison score is low (below an adjustable low threshold) automatically mark them as a different identity.
      If the score is below the high threshold and higher than the low threshold fall back to the manual process as described before until all occurrences are marked.
    Remark: one could use other cluster algorithms to clean up the set of potential affiliates full or half manual. Any data that is helpful to make the decision to resolve if the occurrences are from a different or the same identity can be used.
    Remark: Instead of a binary decision that the occurrences belong or do not belong to the same person the similarity scores could be pertained, defining a similarity matrix of the occurrences.

After clean up, the number of occurrences for each affiliate in the set of potential affiliates is determined. We will name it the affiliate score. This score can be used to display, order or rank the affiliates. Also the score could be retrieved from the similarity matrix e.g. by summing up a row.

For display purposes the affiliates could be displayed like this. Clicking on an associated will display the list of occurrences. Clicking on that in turn will display the original data of the occurrence.

Options:
  One could use multiple options to define spatial proximity to the object of interest including similar inter-eye distance, pixel distance, size & position of detected objects etc.
  One could use the results of face detection to define the set of potential affiliates in the input data.
  One could use facial recognition (1:1 or 1:n) to clean up the set of potential affiliates in the half-manual use case.
  One could use the results of person detection to define the set of potential affiliates in the input data.
  One could use person recognition (1:1 or 1:n) to clean up the set of potential affiliates in the half-manual use case.
  A combination of face and person detection and person recognition
  Any other attribute (e.g. speaker detection and recognition in the audio use case)
  Extension A: Other sources of data
  One could use other data for the detection and clean up purposes e.g.:
    Unique identifiers of devices the target person or the associates are carrying on (e.g. MAC addresses)
    Data of social media posted by the persons or affiliates indicating that they are/were present at a certain time and date in a certain area.
    A combination of all of the above
  Extension B: Analysis of patterns of cars travelling often together by using license plate detection/recognition.
  Extension C: Updating the results
  1.1 Analysis as above is initially done on recorded data
  1.2 Continually updated as new data is available
  1.3 New occurrences of the target person→new non-marked potential affiliates→grouped into either existent affiliates or new affiliates→new number of occurences for all affiliates
  2.1 Analysis starts by marking a target on a live video
  2.2 as 1.2
  2.3 as 1.3
  Extension D: Use of additional filters to determine affiliates
  In many use cases, an affiliate can be further defined as a person/object based on number of occurrences, matching certain description or occurring at a particular size/position within the scene etc. This helps for a faster analysis & determination of an affiliate.

The embodiments described above are only exemplary and the full scope of the invention is defined by the claims.

The invention claimed is:

1. A computer-implemented method of analyzing video data to identify affiliates of an object of interest, the method comprising:
    identifying a plurality of occurrences of the object of interest in the video data;
    determining a set of potential affiliates for the object of interest from a plurality of other objects in the video data based on a criterion of closeness between the object of interest at each occurrence and each other object, wherein the criterion of closeness comprises at least one selected from the group consisting of a spatial proximity to the object of interest and a temporal proximity to the object of interest;
    selecting a reference potential affiliate in the set of potential affiliates in a selected frame of the video data;
    analyzing the set of potential affiliates to obtain a similarity score for each potential affiliate at each occurrence from the plurality of occurrences of the object of interest in frames of the video data other than the selected frame, each similarity score indicating a degree of similarity with respect to the selected reference potential affiliate in the set of potential affiliates;
    wherein analyzing the set of potential affiliates comprises using at least one selected from the group consisting of (1) speaker detection, (2) speaker recognition, (3) a unique identifier of a device that at least one selected from the group consisting of (a) the person of interest and (b) the potential affiliate person carries, and (4) data of social media posted by at least one selected from the group consisting of (a) the person of interest and (b) the potential affiliate person;
    identifying a potential affiliate as an affiliate of the object of interest based on the similarity scores, wherein identifying an affiliate of the object of interest comprises determining an affiliate score;
    wherein the similarity score is non-binary and defined as a probability that a potential affiliate is the same as the reference potential affiliate;
    wherein identifying a potential affiliate of the object of interest comprises determining the affiliate score as a sum of the similarity scores at different occurrences in the plurality of occurrences; and
    wherein the object of interest is a person of interest and the potential affiliates are potential affiliate persons.

2. The method of claim 1, wherein one or more reference potential affiliates are selected manually or automatically.

3. The method of claim 1, further comprising at least one selected from the group consisting of sorting, ranking, and displaying the affiliates according to the affiliate scores.

4. The method according to claim 1, wherein the spatial proximity comprises at least one selected from the group consisting of closeness in space, closeness in pixels, similar inter-eye distance, maximum pixel distance, size and position of detected objects; wherein the temporal proximity comprises the potential affiliate being located within a predefined time interval that includes a respective occurrence of the object of interest.

5. The method according to claim 1, wherein, if the object of interest is a car of interest and the potential affiliates are potential affiliate cars, analyzing the set of potential affiliates comprises analyzing a frequency of occurrence of cars travelling together by using license plate detection/recognition.

6. The method according to claim 1, wherein the method is performed initially on recorded video data or live video data, is continually updated as new video data is available, and new occurrences of the object of interest and/or a new potential affiliate are identified as either one of an existent affiliate or as a new affiliate, in particular further comprising updating a number of occurrences of the affiliates.

7. A device for analyzing video data to identify affiliates of an object of interest, comprising processing circuitry configured to:
    identify a plurality of occurrences of the object of interest in the video data;
    determine a set of potential affiliates for the object of interest from a plurality of other objects in the video data based on a criterion of closeness between the object of interest at each occurrence and each other object, wherein the criterion of closeness comprises a spatial proximity to the object of interest;
    select a reference potential affiliate in the set of potential affiliates in a selected frame of the video data;
    analyze the set of potential affiliates to obtain a similarity score for each potential affiliate at each occurrence from the plurality of occurrences of the object of interest in frames of the video data other than the selected frame, each similarity score indicating a degree of similarity with respect to the selected reference potential affiliate in the set of potential affiliates;
    wherein analyzing the set of potential affiliates comprises using at least one selected from the group consisting of (1) speaker detection, (2) speaker recognition, (3) a unique identifier of a device that at least one selected from the group consisting of (a) the person of interest and (b) the potential affiliate person carries, and (4) data of social media posted by at least one selected from the group consisting of (a) the person of interest and (b) the potential affiliate person;
    identify a potential affiliate as an affiliate of the object of interest based on the similarity scores, wherein identifying an affiliate of the object of interest comprises determining an affiliate score;
    wherein the similarity score is non-binary and defined as a probability that a potential affiliate is the same as the reference potential affiliate;
    wherein identify a potential affiliate of the object of interest comprises determining the affiliate score as a sum of the similarity scores at different occurrences in the plurality of occurrences; and
    wherein the object of interest is a person of interest and the potential affiliates are potential affiliate persons.

8. The device according to claim 7, further comprising a display, wherein the processing circuitry is further configured to display an icon representing the object of interest and icons representing respective affiliates according to an affiliate score, in particular closer to each other the higher the affiliate score.

9. The device according to claim 8, wherein the device is configured to select one or more reference potential affiliates manually or automatically.

10. The device according to claim 7, wherein the device is configured to select one or more reference potential affiliates manually or automatically.

* * * * *